United States Patent
Villa et al.

(10) Patent No.: US 9,156,936 B2
(45) Date of Patent: Oct. 13, 2015

(54) ETHYLENE OXIDE/PROPYLENE OXIDE POLYETHER POLYOLS AND POLYURETHANES MADE THEREFROM

(75) Inventors: Carlos M Villa, Lake Jackson, TX (US); Jean-Paul Masy, Destelbergen (BE); Ricco B. Borella, Zuerich (CH); David A. Babb, Lake Jackson, TX (US); Flor A. Castillo, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 28 days.

(21) Appl. No.: 13/812,501

(22) PCT Filed: Aug. 11, 2011

(86) PCT No.: PCT/US2011/047339
§ 371 (c)(1),
(2), (4) Date: Jan. 26, 2013

(87) PCT Pub. No.: WO2012/027113
PCT Pub. Date: Mar. 1, 2012

(65) Prior Publication Data
US 2013/0143977 A1    Jun. 6, 2013

Related U.S. Application Data

(60) Provisional application No. 61/376,648, filed on Aug. 24, 2010.

(51) Int. Cl.
*C08G 18/32*    (2006.01)
*C08G 65/26*    (2006.01)
*C08L 71/02*    (2006.01)

(52) U.S. Cl.
CPC ........ *C08G 18/3203* (2013.01); *C08G 65/2609* (2013.01); *C08G 65/2624* (2013.01); *C08L 71/02* (2013.01)

(58) Field of Classification Search
CPC .................. C08G 65/2609; C08G 65/2624
USPC .............. 252/182.24; 521/170, 174; 568/613, 568/620
See application file for complete search history.

(56) References Cited

U.S. PATENT DOCUMENTS

| | | | | |
|---|---|---|---|---|
| 4,379,105 A | * | 4/1983 | Taylor et al. | 264/45.5 |
| 4,487,854 A | * | 12/1984 | Hartman | 521/174 |
| 4,521,572 A | * | 6/1985 | Cuscurida et al. | 525/507 |
| 5,030,758 A | | 7/1991 | Dietrich | |
| 5,122,548 A | | 6/1992 | Broos | |
| 5,340,916 A | * | 8/1994 | Henn et al. | 528/405 |
| 5,677,359 A | | 10/1997 | White | |

FOREIGN PATENT DOCUMENTS

| | | | |
|---|---|---|---|
| CA | 2385085 A | 3/2001 | |
| EP | 381784 A | 11/1988 | |
| WO | 2005-044889 A | 5/2005 | |

* cited by examiner

*Primary Examiner* — Melissa Rioja
(74) *Attorney, Agent, or Firm* — Gary C Cohn PLLC

(57) ABSTRACT

Copolymers of propylene oxide and ethylene oxide have an inner block that contains from 65-90 weight percent oxyethylene units and from 10 to 35 weight percent oxypropylene units. This block has a molecular weight of from 150 to 350. The copolymer has an outer block which contains at least 95 weight % oxypropylene units and from 0 to 5% oxyethylene units. The equivalent weight of the copolymer is from 800 to 2000. The copolymers are useful in making polyurethane foams that have unexpectedly high tensile and/or tear strengths.

6 Claims, No Drawings

ETHYLENE OXIDE/PROPYLENE OXIDE POLYETHER POLYOLS AND POLYURETHANES MADE THEREFROM

This application claims benefit from U.S. Provisional Application No. 61/376,648, filed 24 Aug. 2010.

This invention relates to polyether polyols and to polyurethanes made using polyether polyols.

Polyether polyols are widely used raw materials for polyurethanes. Flexible polyurethane foams represent a significant segment of the demand for polyether polyols. Because propylene oxide is inexpensive and widely available, almost all polyether polyols that are used in polyurethane foam formulations are homopolymers of propylene oxide or copolymers of propylene oxide and a minor amount of ethylene oxide.

Ethylene oxide and propylene oxide can be copolymerized in various ways. The ethylene oxide may be polymerized to form terminal blocks. This introduces primary hydroxyl groups and increases the reactivity of the polyether towards isocyanate groups. Block copolymers of that type are often used in making molded polyurethane foam, where a fast cure is wanted.

Polyurethane foams made in a slabstock or free-rise process often do not benefit from the fast reactivity that primary hydroxyl groups provide. Nonetheless, copolymers of ethylene oxide and propylene oxide offer some advantages even in these applications. The presence of polymerized ethylene oxide in limited amounts tends to make more compatible with water or other components of a polyurethane foam formulation and helps processing, without making the polyol so hydrophilic as to make the polyol susceptible to gelling and to hurt the properties of the polyurethane foam. The amount of ethylene oxide is kept somewhat small (typically no greater than 18% by weight), because the polyether can become too hydrophilic if large amounts of ethylene oxide are used. In these cases, the ethylene oxide is most often randomly polymerized with propylene oxide.

Another propylene oxide/ethylene oxide copolymer is described in Canadian Patent Application No. 3485085. That copolymer contains internal oxyethylene blocks that contain no more than 2% of propylene oxide, and external oxypropylene blocks that contain no more than 20% of ethylene oxide. The resulting copolymers are said to be useful in making flexible polyurethane foam. This approach is said to permit the ethylene oxide content of the polyether to be increased, thus improving the space-time efficiency of the polymerization process, without increasing the hydrophilicity of the polyether and of polyurethanes made from the polyether.

There is a continuing desire to improve the physical properties of polyurethane foam. In particular, it is often desirable to increase the tensile strength and/or tear strength of the foam, without significant loss in elongation and without significant increase in compression set. It is desirable to achieve these ends using commonly available, inexpensive raw materials, in particular an inexpensively produced polyether polyol.

This invention is in one aspect a propylene oxide/ethylene oxide copolymer containing two or more hydroxyl-terminated polyether chains extending from the residue of an initiator compound, wherein the polyether chains each contain an inner block and an outer block, the inner blocks each having a molecular weight of from about 150 to 350 and containing from 10 to 35% by weight of oxypropylene units and from 65 to 90% by weight of oxyethylene units, and the outer blocks each containing from 95 to 100% by weight oxypropylene units and from 0 to 5% by weight oxyethylene units, and further wherein the propylene oxide/ethylene oxide copolymer has a hydroxyl equivalent weight of from 800 to 2000 and a total oxyethylene content of from 5 to 18% by weight.

This invention is also a process for making a blend of polyether polyols, comprising alkoxylating an initiator compound having an equivalent weight per hydroxyl and/or amine hydrogen of from 30 to 150 and at least two hydroxyl and/or amine hydrogens per molecule with a mixture of from 65 to 90 weight % ethylene oxide and from 10 to 35 weight % propylene oxide to form an intermediate having polyether chains with molecular weights of from 150 to 350 extending from the residue of the initiator compound, mixing the intermediate with a different initiator compound having an equivalent weight per hydroxyl and/or amine hydrogen of from 15 to 100 and at least two hydroxyl and/or amine hydrogens per molecule, and alkoxylating the resulting mixture with propylene oxide or a mixture of at least 95% by weight propylene oxide and up to 5% by weight ethylene oxide to form a polyether polyol blend having a hydroxyl equivalent weight of from 800 to 2000. This process is useful for making polyether polyols blends that can be used to form good quality polyurethane foams.

The invention is also a process for making a polyurethane foam comprising forming a foam formulation containing at least (a) one or more polyether polyol(s) having a hydroxyl equivalent weight of from 800 to 2000, wherein at least 60% by weight of the polyether polyol(s) is one or more propylene oxide/ethylene oxide copolymers containing two or more hydroxyl-terminated polyether chains extending from the residue of an initiator compound, wherein the polyether chains each contain an inner block and an outer block, each inner block having a molecular weight of from about 150 to 350 and containing from 10 to 35% by weight of oxypropylene units and from 65 to 90% by weight of oxyethylene units, and each outer block containing from 95 to 100% by weight oxypropylene units and from 0 to 5% by weight oxyethylene units, and further wherein the propylene oxide/ethylene oxide copolymer has a hydroxyl equivalent weight of from 800 to 2000 and a total oxyethylene content of from 5 to 18% by weight;

(b) at least one blowing agent;

(c) at least one organic polyisocyanate; and (d) at least one surfactant and at least one catalyst for the reaction of an isocyanate group with a hydroxyl group, and curing the foam formulation to form a polyurethane foam.

This invention is also a polyurethane foam made according to the foregoing process. The foams of the invention are useful in cushioning, seating and bedding applications.

The propylene oxide/ethylene oxide copolymer(s) preferably have a hydroxyl equivalent weight of at least 1000. Its hydroxyl equivalent weight can be, in some embodiments, up to 1700 or up to 1500. The inner blocks each preferably contain from 20 to 30% by weight oxypropylene units and from 70 to 80% oxyethylene units. The molecular weight of the inner blocks is preferably from 180 to 300 and more preferably from 200 to 300. The outer block preferably contains from 98 to 100% by weight oxypropylene oxide and from 0 to 2% by weight of oxyethylene units. The total oxyethylene content of the propylene oxide/ethylene oxide copolymer preferably at least 8% by weight, more preferably at least 12% by weight, and in some embodiments is up to 18% by weight. The average hydroxyl functionality of the propylene oxide/ethylene oxide copolymer(s) is preferably from 2 to 8 and more preferably from 2 to 4. Functionalities for purposes of this invention are nominal functionalities, and are taken to be equal to the average number of hydroxyl and/or amine hydrogens on the initiator compound(s) used to prepare the polyol. The propylene oxide/ethylene oxide copolymer preferably contains at least 75% secondary hydroxyl groups, and more preferably from 85 to 100% secondary hydroxyl groups.

The propylene oxide/ethylene oxide copolymer can be prepared in a multi-step polymerization in which alkylene oxides are polymerized onto an initiator compound that has hydroxyl groups, primary or secondary amino groups, or both hydroxyl and primary or secondary amino groups. The initiator compound has a total of at least two hydroxyl and/or amino hydrogens. The initiator compound may have as many as eight or more hydroxyl and/or amine hydrogens. A preferred initiator has a total of from 2 to 4 hydroxyl and/or amine hydrogens. A still more preferred initiator contains from 2 to 4 hydroxyl groups and no primary or secondary amino groups. The equivalent weight per hydroxyl and/or amine hydrogen is suitably from about 15 to 100, more preferably from about 20 to about 75. Examples of suitable initiator compounds include ethylene glycol, diethylene glycol, propylene glycol, dipropylene glycol, glycerin, trimethylolpropane, trimethylolethane, pentaerythritol, sorbitol, sucrose, ethylene diamine, toluene diamine, aniline, methylene dianiline, ethanolamine, diethanol amine, triethanolamine, 3,3'-diamino-N-methyldipropylamine, 3,3'-diamino-N-ethyldipropylamine, 2,2'-diamino-N-methyldiethylamine, N-methyldiethanolamine, N-methyldipropanolamine, N-(2-hydroxyethyl)-N-methyl-1,3-propane diamine, N-(2-hydroxyethyl)-N-methyl-1,2-ethane diamine and the like.

The inner blocks are formed by polymerizing a mixture of 65 to 90% by weight ethylene oxide and from 10 to 35% by weight propylene oxide onto the initiator compound. This polymerization continues until blocks having a molecular weight as specified before are formed onto the initiator. Propylene oxide or a mixture of propylene oxide with up to 5% by weight ethylene oxide is then added to the resulting intermediate and polymerized until the polyether polyol achieves a molecular weight as described before. The polymerization steps are performed at elevated temperature, such as from 120 to 180° C., in the presence of a polymerization catalyst. Examples of suitable polymerization catalysts include alkali metal hydroxides and the so-called double metal cyanide catalysts such as a zinc hexacyanocobaltate catalyst complex. The double metal cyanide catalyst should not be used when the initiator and/or product of the first polymerization step contains amine groups. It is often advantageous to perform the first polymerization step in the presence of an alkali metal catalyst, and to perform the second polymerization step in the presence of a double metal cyanide catalyst. The resulting propylene oxide/ethylene oxide compound can be represented by the structure

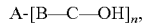

where A represents the residue of the initiator compound, B represents the inner block, C represents the outer block, and n is a number equal to the total number of hydroxyl and amine hydrogens originally on the initiator compound. The inner block B contains from 65 to 90% by weight oxyethylene groups and from 10 to 35% by weight oxypropylene groups. The inner block B has a molecular weight of from 150 to 350. The outer block C contains at least 95% by weight oxypropylene groups and the remainder oxyethylene groups. n is preferably from 2 to 4.

Two or more propylene oxide/ethylene oxide copolymers as described may be present. In addition, component (a) may also include at least one additional polyether polyol that has a hydroxyl equivalent weight of from 800 to 2000 but is different from the polypropylene oxide/ethylene oxide copolymer(s). Such an addition polyether polyol may be, for example, a homopolymer of propylene oxide, a random copolymer of propylene oxide and ethylene oxide, a block copolymer having one or more poly(oxyethylene) blocks and one or more poly(propylene oxide) blocks. Component (a) as a whole preferably has an average hydroxyl equivalent weight of from 800 to 2000, more preferably from 800 to 1500, and an average hydroxyl functionality of from 2 to 5, more preferably from 2.5 to 3.5. It is preferred that component (a) contains at least 60% by weight, and preferably at least 80% by weight, of the propylene oxide/ethylene oxide copolymer. Component (a) may contain up to 100% by weight of the propylene oxide/ethylene oxide copolymer.

Mixtures of the propylene oxide/ethylene oxide copolymer with an additional polyether polyol can be prepared in a single polymerization process. This can be accomplished, for example, by polymerizing a mixture of ethylene oxide and propylene oxide onto an initiator to form an intermediate as described before. This intermediate can then be combined with one or more additional different initiators, and then further alkoxylated with propylene oxide or a mixture of propylene oxide and up to 5% by weight ethylene oxide. The additional different initiator has an equivalent weight per hydroxyl or amine hydrogen of from 15 to 100, and may contain a total of from 2 to 8, preferably from 2 to 4 hydroxyl and amine hydrogens per molecule.

Component (a) may contain dispersed polymer particles. If present, the polymer particles may constitute from 8 to 30%, preferably from 8 to 15% of the total weight of component (a). The polymer particles may be, for example, a polymer of copolymer of a vinyl aromatic monomer such as styrene; a polymer or copolymer of acrylonitrile; a polyurethane; a polyurea; a polyurethane-urea; or other suitable polymer. Styrene-acrylonitrile copolymer particles are a particularly preferred type. The dispersed polymer particles may be polymerized in situ within one or more of the polyether polyol(s). The dispersed polymer particles have particle sizes from 100 nm to 50 microns and preferably from 500 nm to about 30 microns. The dispersed polymer particles are preferably grafted onto at least a portion of the polyether polyol molecules.

The blowing agent (component (b)) may be a physical (endothermic) or chemical (exothermic) type. Water is a highly preferred blowing agent. As is well known, water performs both a blowing function and chain extension function by reacting with isocyanate groups to generate carbon dioxide and form urea linkages. Water is preferably the sole blowing agent in the foam formulation, although it is possible to include an auxiliary blowing agent within the foam formulation, in addition to the water. The auxiliary blowing agent may be a chemical type such as a carbamate or a physical blowing agent such as, for example, carbon dioxide or a low-boiling hydrocarbon, hydrofluorocarbon or hydrochlorofluorocarbon. In the preferred case in which water is the sole blowing agent, the amount of water is an important contributing factor to the density of the resulting foam. At least 1.5, preferably at least 2.0 parts by weight of water are present per 100 parts of component (a). Up to 7 parts of water can be used, preferably up to 5 parts of water, again by weight per 100 parts by weight of component (a).

Component (c) is an organic polyisocyanate or mixture thereof having an average of 1.8 or more isocyanate groups per molecule. The isocyanate functionality is preferably from about 1.9 to 4, and more preferably from 1.9 to 3.5 and especially from 1.9 to 2.7. The isocyanate equivalent weight may be from about 70 to 200, preferably from 70 to 160, except that higher isocyanate equivalent weights may be used if the polyisocyanate is formed into a prepolymer as part of the process of forming a polyurethane. Suitable polyisocyanates include aromatic, aliphatic and cycloaliphatic polyisocyanates. Aromatic polyisocyanates are generally preferred based on cost, availability and properties imparted to the product polyurethane. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane tri-isocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates include MDI and derivatives of MDI such as biuret-modified "liquid" MDI products and polymeric MDI, as well as mixtures of the 2,4- and 2,6-isomers of TDI. Another useful polyisocyanate is a mixture of TDI isomers with MDI or polymeric MDI, in which the TDI isomers constitutes from 60-90% by weight of the mixture, and in which the 2,4-TDI isomer constitutes at least 70% by weight of the TDI isomers. Such an isocyanate product is available as Voranate® TM-20 from The Dow Chemical Company.

The amount of polyisocyanate that is used typically is sufficient to provide an isocyanate index of from 70 to 125. A preferred range is from 80 to 120 and a more preferred range is from 90 to 115. Isocyanate index is 100 times the ratio of isocyanate groups to isocyanate-reactive groups in the formulation.

Components (a) and (c) (and component (b) if it is water or other isocyanate-reactive blowing agent) react together to form the polyurethane foam of the invention. In addition to components (a)-(c), the foam formulation may contain other reactive ingredients. These other reactive ingredients suitably have equivalent weights per isocyanate-reactive group of up to 799 and more preferably up to 250. These optional other reactive materials include chain extenders, which have exactly two isocyanate-reactive groups per molecule, and cross-linkers, which have three or more isocyanate-reactive groups per molecule. Chain extenders and cross-linkers preferably have equivalent weights from 30 to 150 and more preferably from 30 to 125. The isocyanate-reactive groups may be, for example, hydroxyl, primary amino or secondary amino groups. Examples of chain extenders and crosslinkers include alkylene glycols such as ethylene glycol, 1,2- or 1,3-propylene glycol, 1,4-butanediol, 1,6-hexanediol, and the like; glycol ethers such as diethylene glycol, triethylene glycol, dipropylene glycol, tripropylene glycol and the like; cyclohexane dimethanol; glycerine; trimethylolpropane; triethanolamine; diethanolamine and the like.

Chain extenders and cross-linkers, if present, each are generally used in small amounts, typically no more than about 5 parts by weight of each per 100 parts of component (a). Chain extenders and/or crosslinkers, if present at all, are each preferably present in an amount from 0.1 to 2 parts, more preferably from 0.1 to 1 part by weight per 100 parts of component (a).

The resilient, flexible polyurethane foam of the invention is the reaction product of the foregoing reactive ingredients of the foam formulation. In addition to the reactive ingredients, the foam formulation typically includes at least one catalyst and at least one silicone surfactant.

One preferred type of catalyst is a tertiary amine catalyst. The tertiary amine catalyst may be any compound possessing at least one tertiary amine group and which has catalytic activity for the reaction between a polyol and a polyisocyanate and at least one tertiary amine group. Representative tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, bis(2-dimethylaminoethyl)ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl)ether, N,N-bis(3-dimethylaminopropyl)N-isopropanolamine, (N,N-dimethyl)aminoethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine)ethyl)ether, tris(dimethylamino propyl)amine, dicyclohexyl methyl amine, bis(N,N-dimethyl-3-aminopropyl)amine, 1,2-ethylene piperidine and methyl-hydroxyethyl piperazine.

The foam formulation may contain one or more other catalysts, in addition to or instead of the tertiary amine catalyst mentioned before. Suitable such catalysts include, for example:
1) tertiary phosphines such as trialkylphosphines and dialkylbenzylphosphines;
2) chelates of various metals, such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni;
3) acidic metal salts of strong acids, such as ferric chloride, stannic chloride, stannous chloride, antimony trichloride, bismuth nitrate and bismuth chloride;
4) strong bases, such as alkali and alkaline earth metal hydroxides, alkoxides and phenoxides;
5) alcoholates and phenolates of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols;
6) alkaline earth metal, Bi, Pb, Sn or Al carboxylate salts; and
7) tetravalent tin compounds, and tri- or pentavalent bismuth, antimony or arsenic compounds.

Of particular interest are tin carboxylates and tetravalent tin compounds. Examples of these include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be 0.0015 to 5, preferably from 0.01 to 1 part by weight per 100 parts by weight of component (a). Metallic catalysts, in particular tin catalysts are typically used in amounts towards the low end of these ranges.

One or more silicone surfactants is preferably included in the foam formulation to help regulate cell size and/or to stabilize the foam as it expands and cures. One type of useful silicone surfactant is a polydimethylsiloxane type. Another useful type of silicone surfactant has a polysiloxane backbone which is modified with poly(oxyalkylene groups). Mixtures containing at least one surfactant of each type can be used.

Various additional components may be included in the foam formulation. These include, for example, fillers, plasticizers, colorants, preservatives, odor masks, flame retardants, biocides, antioxidants, UV stabilizers and antistatic agents.

Foam is prepared from the foregoing ingredients by mixing them to form a foam formulation and subjecting the foam formulation to conditions such that the reaction mixture cures to from a polyurethane foam. Some or all of the isocyanate-reactive ingredients can be mixed together in various subcombinations before being brought into contact with the organic polyisocyanate. The components are conveniently at a temperature of from about 10° C. to about 50° C. when the organic isocyanate is brought into contact with the isocyanate-reactive materials. Curing in many cases proceeds adequately without the further application of heat to the mixture. However, the curing mixture may be heated if desired to drive the polymerization and foaming processes.

Foam can be prepared in accordance with the invention via a so-called slabstock or free-rise process or by various molding processes. In a slabstock or free rise process, the various components are introduced individually or in various subcombinations into a mixing head, where they are mixed and dispensed into a trough. The dispensed mixture typically expands and cures without applied heat. In the slabstock process, the reacting mixture expands freely or under minimal restraint (such as may be applied due to the weight of a cover sheet or film).

In a molding process, the reaction mixture is formed and then dispensed into a closed mold where curing occurs. The mold can be heated, but doing so is not always necessary. Molding conditions may be selected to produce an integral skin on the surface of the molded foam. Enough of the reaction mixture is charged to the mold so that the mixture expands and fills the mold and produces a foam having the aforementioned density. The mixture is cured in the mold until it can be removed without damage or permanent distortion. The demolded foam can be postcured by heating it after it has been removed from the mold.

Foam made in accordance with the invention advantageously has a core density in the range of 24 to 128 kg/m$^3$, preferably from 24 to 64 kg/m$^3$. Density is conveniently measured according to ISO 845, after removing any exterior skin that may be formed during the foaming process.

It has been found that the propylene oxide/ethylene oxide copolymer provides polyurethane foam with increased tensile strength and/or tear strength, compared to a like foam made using otherwise similar polyether polyols which do not contain the inner block/outer block architecture of the propylene oxide/ethylene oxide copolymer of this invention. This increase in tensile and/or tear strength is often seen without an increase in the density of the foam, without significant loss in elongation, and without increase in compression set. Therefore, this invention offers a simple and inexpensive approach to increasing tensile and/or tear strength of a polyurethane foam.

Foam made in accordance with the invention are useful in a variety of packaging, seating and other cushioning applications, such as mattresses, furniture cushions, automotive seating, bumper pads, sport and medical equipment, helmet liners, pilot seats, earplugs, and various other noise and vibration dampening applications.

The following examples are provided to illustrate the invention, but are not intended to limit the scope thereof. All parts and percentages are by weight unless otherwise indicated.

EXAMPLE 1 AND COMPARATIVE SAMPLES A AND B

Glycerin is alkoxylated to a molecular weight of about 800 by polymerizing 12 moles of ethylene oxide and 3 moles of propylene oxide per mole of glycerin in the presence of a potassium hydroxide catalyst. This alkoxylation step is performed in a plug flow reactor having a volume of about 25 liters. This forms an intermediate having randomly polyether chains of approximately 234 molecular weight. These polyether chains contain approximately 75% by weight oxyethylene units and 25% by weight oxypropylene units. When the second step polymerization (described immediately below) is completed, these polyether chains will constitute the inner blocks of a propylene oxide/ethylene oxide copolymer of the invention.

The intermediate is fed into a loop reactor that has a volume of 60 liters. Propylene glycol is fed into the reactor upstream of the point at which the intermediate is added, at a rate of about 1 mole of propylene glycol per 4.55 moles of the intermediate. Propylene oxide is fed into the reactor downstream of the point at which the intermediate is added. The loop reactor is operated at a flow rate of 7500 kg/hr, at a temperature of 160° C., and in the presence of 40 ppm of a zinc hexacyanocobaltate catalyst complex. Feed and product removal rates are selected to add poly(oxypropylene) blocks of about 962 onto the ends of the intermediate and onto the end of the propylene glycol. This produces a mixture of about 11% by weight of a poly(propylene oxide) diol having a molecular weight of about 2000, and about 89% by weight of a trifunctional propylene oxide/ethylene oxide copolymer that has a molecular weight of about 3600 (Polyol Example 1). The average molecular weight for the product is about 3300. The average functionality of the product is about 2.82. The propylene oxide/ethylene oxide copolymer has hydroxyl-terminated polyether chains extending from the residue of the glycerin molecules. The polyether chains include an inner block of about 234 molecular weight that contains about 75% by weight oxyethylene units and 25% by weight oxypropylene units. The polyether chains include an outer block of homopolymerized propylene oxide. The outer blocks have weights of approximately 962 molecular weight. The propylene oxide/ethylene oxide copolymer portion of Polyol Example 1 contains about 14.6% by weight oxyethylene units. Polyol Example 1 as a whole contains 13% by weight oxyethylene groups.

Comparative Polyol A is prepared by alkoxylating glycerin with propylene oxide to form an intermediate having a molecular weight of about 800. The intermediate is fed into a loop reactor that has a volume of 60 liters. Propylene glycol is fed into the reactor upstream of the point at which the intermediate is added, at a rate of about 1 mole of propylene glycol per 4.55 moles of the intermediate. Propylene oxide and ethylene oxide are separately fed into the reactor downstream of the point at which the intermediate is added. The proportions of ethylene oxide and propylene oxide are selected so that the product (Comparative Polyol A) contains about 13% oxyethylene groups. The loop reactor is operated under the same conditions as described for Polyol Example 1, with feed and product removal rates again being selected to produce a product that has a molecular weight of 3300. Comparative Polyol A is a mixture of a difunctional, random copolymer of ethylene oxide and propylene oxide and a trifunctional polyol having inner all-propylene oxide blocks and outer blocks of randomly polymerized ethylene oxide and propylene oxide. This polyol is representative of randomly polymerized propylene oxide/ethylene oxide polyols that are commonly used to produce flexible slabstock polyurethane foams.

Comparative Polyol B is prepared in the same manner as Polyol Example 1, except that the intermediate is made by homopolymerizing ethylene oxide onto glycerin, and the ratios of ethylene oxide and propylene oxide in the second polymerization step are adjusted to produce a polyol containing 13% oxyethylene groups. Comparative Polyol B generally represents the type of polyol described in CA 2,385,085, and is made to have the same average hydroxyl functionality and molecular weight as Polyol Example 1.

Polyurethane foam Example 1 is prepared by processing Polyol Example 1 (100 parts), 0.05 parts of a tin catalyst, 0.15 parts of a tertiary amine catalyst, 0.7 parts of a silicone surfactant, 0.22 parts of stannous octoate (SO) and 2.2 parts water with an 80/20 mixture of the 2,4- and 2,6-isomers of toluene diisocyanate at a 110 index. Processing is performed on a Polymech slabstock foam machine using liquid laydown technology. Conveyor width is 80 cm; mixer speed is 6500 rpm, raw material temperatures are 23° C., and polyol output is 20 kg/minute. The foam is allowed to rise freely and cure.

Comparative polyurethane foams A and B are prepared in like manner, substituting Comparative Polyols A and B, respectively, for the Polyol Example 1 material.

Density, 40% compression force deflection, resilience, tear strength, tensile strength, elongation and 50%, 75% and 90% compression sets are measured. Results are indicated in the following table.

|  | Example or Comparative Sample | | |
|---|---|---|---|
| Property | Example 1 | Comp. Sample A | Comp. Sample B |
| Density, kg/m$^3$ | 41.0 | 39.3 | 40.7 |
| 40% Compression Force Deflection, kPa | 3.80 | 3.86 | 3.70 |
| Resilience, % | 55.2 | 53.5 | 54.1 |
| Tear strength, N/m | 401 | 390 | 364 |
| Tensile strength, kPa | 100.8 | 87.4 | 88.1 |
| Elongation, % | 222 | 178 | 201 |
| Compression Set, % | | | |
| 50% | 0.25 | 0.36 | 0.19 |
| 75% | 1.18 | 0.96 | 0.21 |
| 90% | 1.58 | 2.77 | 2.17 |

Polyurethane foam Example 1 has a 40% CFD value, resilience and compression set comparable to those of the Comparative Samples. However, tensile strength is about 10% greater than that of either of the Comparative Samples, even after adjusting for the slightly higher foam density of Example 1. This increase in tensile strength is achieved together with a small but significant increase in elongation. Tear strength is also increased relative to both Comparative Samples. In this set of tests, the polyol having an internal all-EO block (Comparative Polyol B) performs very similarly to Comparative Polyol A (the randomly polymerized material). Between those two polyols, the distribution of the oxyethylene units is not seen to have significant effect on the foam properties. However, when the ethylene oxide is distributed into an internal randomly polymerized block, terminated in an all-PO block (Polyol Example 1), a significant increase in tensile strength and elongation are seen, together with an increase in tear strength and without loss in other important properties.

The invention claimed is:

1. A propylene oxide/ethylene oxide copolymer containing two or more hydroxyl-terminated polyether chains extending from a residue of an initiator compound, wherein the polyether chains each contain an inner block and an outer block, wherein the inner block of each of said polyether chains has a molecular weight of from about 150 to 350 and contains from 10 to 35% by weight of oxypropylene units and from 65 to 90% by weight of oxyethylene units, and the outer block of each of said polyether chains contains from 95 to 100% by weight oxypropylene units and from 0 to 5% by weight oxyethylene units, and further wherein the propylene oxide/ethylene oxide copolymer has a hydroxyl equivalent weight of from 800 to 2000 and a total oxyethylene content of from 5 to 18% by weight.

2. The propylene oxide/ethylene oxide copolymer of claim 1 which has a hydroxyl equivalent weight of at least 1000.

3. The propylene oxide/ethylene oxide copolymer of claim 2 wherein the inner block of each of said polyether chains contains from 20 to 30% by weight oxypropylene units and from 70 to 80% by weight oxyethylene units and has a molecular weight of from 180 to 300.

4. The propylene oxide/ethylene oxide copolymer of claim 3 wherein the outer block of each of said polyether chains contains from 0 to 2% by weight oxyethylene units.

5. The propylene oxide/ethylene oxide copolymer of claim 4 which has a total oxyethylene content of from 12 to 18% by weight.

6. A process for making a blend of polyether polyols, comprising alkoxylating an initiator compound wherein the initiator compound has at least two hydroxyl and/or amine hydrogens per molecule and an equivalent weight per hydroxyl and/or amine hydrogen of from 30 to 150 with a mixture of from 65 to 90 weight % ethylene oxide and from 10 to 35 weight % propylene oxide to form an intermediate having polyether chains with molecular weights of from 150 to 350 extending from a residue of the initiator compound, mixing the intermediate with a different initiator compound wherein said different initiator compound has least two hydroxyl and/or amine hydrogens per molecule and an equivalent weight per hydroxyl and/or amine hydrogen of from 15 to 100 to form a mixture of the intermediate and the different initiator compound, and alkoxylating the mixture with propylene oxide or a mixture of at least 95% by weight propylene oxide and up to 5% by weight ethylene oxide to form a polyether polyol blend having a hydroxyl equivalent weight of from 800 to 2000.

* * * * *